United States Patent [19]

Stickel et al.

[11] Patent Number: 4,903,392

[45] Date of Patent: Feb. 27, 1990

[54] METHOD FOR REMOVING A METALLIC PLUG FROM A TUBE BY SIMULTANEOUSLY HEATING AND STRETCHING THE PLUG

[75] Inventors: Mark M. Stickel, Murrysville Borough; James W. Everett; Ray A. Shirey, both of New Stanton; Roy D. Hosley, Murrysville; Eugene P. Ciferno, South Huntington Twp., Westmoreland County; George D. Fulmer, Hempfield Twp., Westmoreland County, all of Pa.

[73] Assignee: Westinghouse Electric Corp., Pittsburgh, Pa.

[21] Appl. No.: 209,817

[22] Filed: Jun. 22, 1988

[51] Int. Cl.$^4$ .............................. B23P 19/04
[52] U.S. Cl. .............................. 29/426.5; 29/426.1
[58] Field of Search ............... 29/426.1, 426.2, 426.3, 29/426.4, 426.5, 426.6, 447, 727, 800, 402.06, 244, 525, 723; 138/89, 97

[56] References Cited

U.S. PATENT DOCUMENTS

| | | | |
|---|---|---|---|
| 4,237,937 | 12/1980 | Healy, Sr. | 138/97 |
| 4,290,543 | 9/1981 | Larson | 228/2.5 |
| 4,298,054 | 11/1981 | Adamowski . | |
| 4,310,029 | 1/1982 | Dudek . | |
| 4,366,617 | 1/1983 | Nanstiel et al. | 29/727 |
| 4,386,458 | 6/1983 | Evans | 29/447 X |
| 4,390,042 | 6/1983 | Kucherer et al. | 138/89 |
| 4,394,202 | 7/1983 | Thomas et al. | 138/97 X |
| 4,409,731 | 10/1983 | Campbell | 29/800 |
| 4,425,943 | 1/1984 | Martin | 138/89 |
| 4,425,944 | 1/1984 | Heuckelbach et al. | 138/89 |
| 4,591,068 | 5/1986 | Tolino et al. . | |
| 4,598,738 | 7/1986 | Weber et al. | 138/89 |
| 4,800,637 | 1/1989 | Overbay | 29/727 X |

FOREIGN PATENT DOCUMENTS 2117863A 3/1983 United Kingdom .

OTHER PUBLICATIONS

U.S. Patent Application Ser. No. 819,084, filed 1/15/86 by Phillip J. Hawkins, "Tube Plug Removal Machine".
U.S. Patent Application Ser. No. 050,799, filed 5/18/87 by James W. Everett et al., "Improved System and Method for Removing a Plug From a Heat Exchanger".

Primary Examiner—Timothy V. Eley
Assistant Examiner—Peter D. B. Vo
Attorney, Agent, or Firm—L. A. DePaul

[57] ABSTRACT

A method for removing metallic plugs from conduits such as the heat exchanger tubes in a nuclear steam generator is disclosed herein. In such tubes, plugs formed from a cylindrical shell of Inconel are radially expanded in sealing engagement with the open end of an Inconel tube mounted in a tubesheet by pulling down a cork-shaped expander element disposed in wedging engagement with the shell. The method of the invention removes such plugs by pushing the expander element from the open end back to the closed end of the shell, and then heating the shell to a temperature which substantially lessens its tensile yield while applying a tensile force along the longitudinal axis of the plug shell sufficient to elongate it. In the method, an electrically conductive push-rod is utilized which simultaneously conducts a substantial current of electricity through the plug shell while pushing against the closed end thereof.

8 Claims, 6 Drawing Sheets

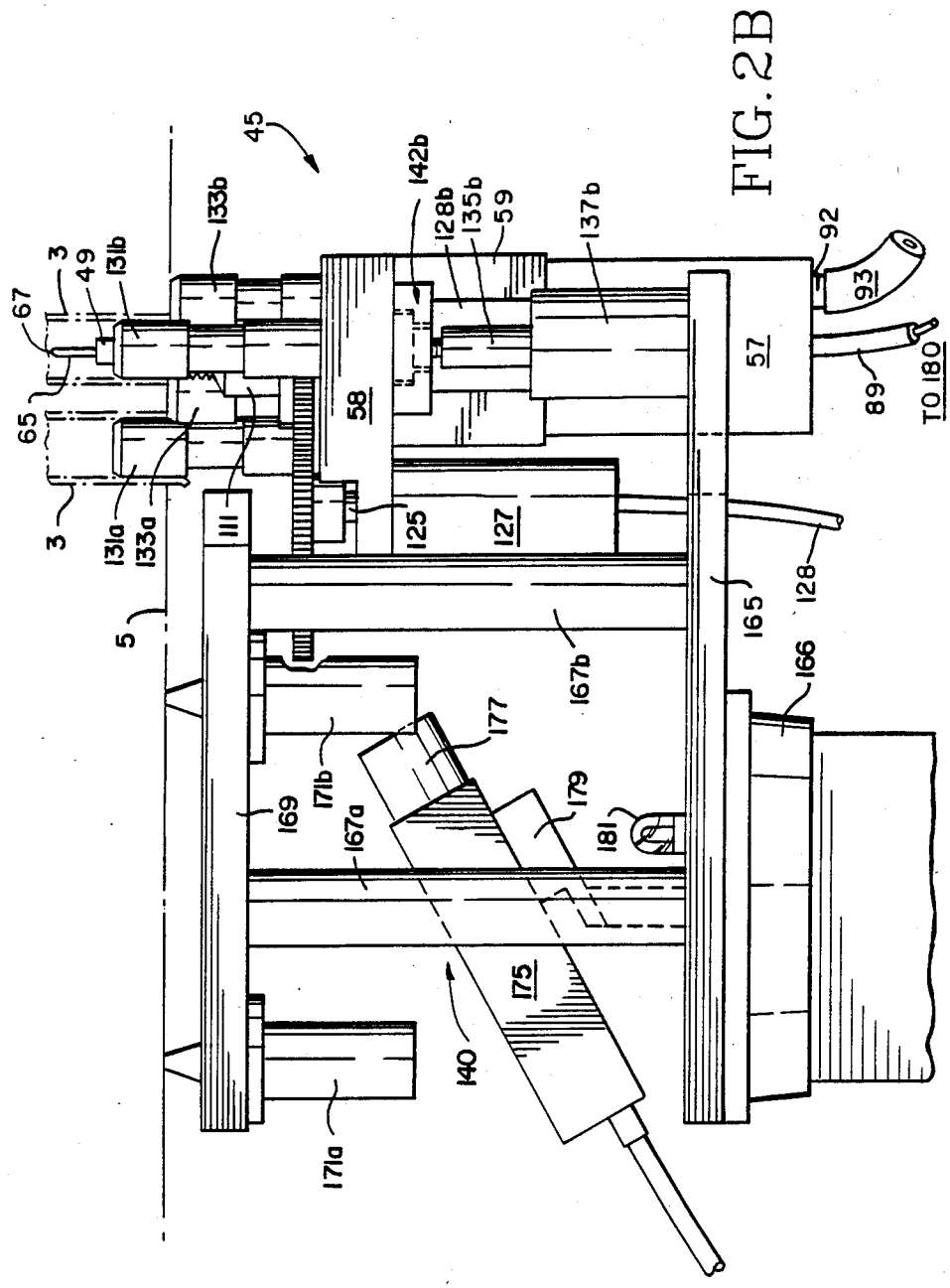

METHOD FOR REMOVING A METALLIC PLUG FROM A TUBE BY SIMULTANEOUSLY HEATING AND STRETCHING THE PLUG

BACKGROUND OF THE INVENTION

This invention generally relates to methods and devices for removing plugs from conduits, and is specifically concerned with the removal of nickel alloy plugs from the heat exchanger tubes that are mounted in the tubesheet of a nuclear steam generator.

Tooling systems for removing the plugs from the heat exchanger tubes in a nuclear steam generators are known in the prior art. The use of such devices has become increasingly popular in recent years as new mechanical and heat treating techniques have recently become available for putting such plugged tubes back into service. However, in order to fully appreciate the operation and utility of such prior art plug-pulling tooling systems, a general understanding of the structure and operation of the plugs used in such tubes is necessary.

The plugs that are most frequently used to plug the heat exchanger tubes of nuclear steam generators are formed from a tubular shell of Inconel that is open on its proximal end and closed at its distal end. The interior of the shell contains a further conically shaped expander member. In one of the most commonly used types of plugs, the expander element is shaped like a common cork used to seal a bottle, and is disposed completely within the interior of the shell with its larger circular end in abutment with the inner surface of the closed distal end of the plug shell. The shell walls are not truly tubular, but are slightly tapered from the distal closed end to the proximal open end of the shell. When the cork-shaped expander element is forcefully drawn from the closed end toward the open end of the shell by hydraulic ram, it will radially expand the plug in sealing engagement with the interior wall of the tube by a wedging action. Such a plug design is described in U.S. Pat. No. 4,390,042 invented by Harvey D. Kucherer and assigned to the Westinghouse Electric Corporation. The forceful pulling of the cork-shaped expander element along the longitudinal axis of the shell not only radially expands the wall of the shell outwardly as the expander element is wedgingly drawn towards the proximal end of the shell, but further applies an extruding force to the metallic walls of the shell along the longitudinal axis thereof. The end result is that the lands circumscribing the outer walls of the shell are sealingly engaged against the interior wall of the heat exchanger tube.

Generally, such plugs are used to seal off one or more of the U-shaped heat exchanger tubes contained within a nuclear steam generator when the walls of these tubes become corroded or otherwise damaged beyond repair. This is accomplished by inserting an unexpanded plug into the open end of the tube which is mounted in the tubesheet of the steam generator. A hydraulic ram is then placed over the plug onto the tubesheet and connected to the expander element, which at this point is disposed in abutment with the closed end of the plug shell. The expander element is drawn down by the pull-rod of the ram to the open end of the shell which radially expands it in the manner heretofore described, thereby securing the plug into the open end of the tube. If such corroded or damaged tubes are not plugged, they may crack and allow radioactive water from the primary side of the generator to leak into the non-radioactive water in the secondary side. Such a leakage could, in turn, result in the radioactive contamination of the non-radioactive steam that Westinghouse-type nuclear generators provide to turn the turbines of the electric generators of the plant. Hence the plugging of potentially defective heat exchangers tubes is an important maintenance operation.

Recently, however, new maintenance procedures pioneered by the Westinghouse Electric Corporation have made it possible to repair heat exchanger tubes in nuclear steam generators that were heretofore considered beyond repair. Such techniques include tube expansions to eliminate the annular clearances between the heat exchanger tubes and the tubesheets and support plates in the generator, as well as new stress-relief techniques such as rotopeening and annealing with radiant heaters. As the plugging of a heat exchanger tube diminishes the capacity of a nuclear steam generator to generate power, it has become increasingly popular to remove the plugs that were placed in the open ends of heat exchanger tubes when the repair and maintenance of such tubes becomes possible as a result of the new repair techniques.

Prior art plug-removing devices have generally comprised a push-rod for pushing the expander element back toward the closed end of the shell to relax the shell within the tube, and a pulling fitting concentrically disposed around the push-rod for threadedly engaging and pulling the plug shell from the open end of the tube after the push-rod has moved the expander element upwardly. Such devices are generally powered by a hydraulic ram having two concentrically disposed hydraulic cylinders.

Unfortunately, the use of such prior art plug pulling devices does not always produce perfect results. For example, because of the extruding force that the expander element applies between the lands on the outer shell wall in the interior wall of the tube, some degree of solid phase welding occurs between the shell and the tube. Hence, the hydraulic cylinder connected to the fitting that pulls the plug from the tube may have to apply as much as 14,000 pounds of tensile force before the plug is successfully pulled out. The application of this tensile force in combination with the solid phase welding that has occurred between the plug and the tube may cause a significant amount of galling and scratching to occur within the open end of the tube as a result of the removal operation. Such scratching and galling not only mars the inner surface of the tube, but more importantly, generates stresses in the tube mouth which may give rise to stress corrosion cracking. Other imperfections of such prior art devices include their incompatability for use with commercially-available robotic devices, such as the ROSA developed by the Westinghouse Electric Corporation. The causes of such incompatability include excessive tool weight, and the difficulty of aligning the working ends of these tools with the open end of the tube to be unplugged. Of course, such tools can be operated manually within the channel head of a nuclear steam generator. However, such manual operation may result in the exposure of the operator to potentially harmful radiation.

To avoid the galling and scratching problem, the applicants have developed multi-tool systems that impart a greater degree of relaxation between the outside surface of the plug and the inner surface of the tube before the plug is pulled from the tube. Unfortunately, all of the tooling systems thus far contemplated require the successive use of different tools before the plug is sufficiently relaxed within the tube so as to be removable therefrom without scratching our galling. Hence, the time required to use such systems is substantially greater than the time necessary for a hydraulic ram to simply pull the plug out of the tube mouth. As downtime for such steam generators can cost the utility involved over one-hundred thousand dollars a day in lost revenues, the extra time required for the use of a multiple-tool plug removing system presents an added expense which partially offsets the advantage of scratch-free plug removal.

Clearly, there is a need for a device for removing plugs from the heat exchanger tubes in nuclear steam generators which does not scratch or gall the open ends of the tubes. Ideally, such a device should be remotely operable by means of a commercially available robotic device so as to minimize both the exposure of service personnel to potentially harmful radiation, and the cost of using the device. Finally, it would be desirable if the device were capable of removing plugs at least as quickly as prior art hydraulic ram devices, so that the advantage of scratch-free removal would not be offset by any increase in time required to operate the device.

SUMMARY OF THE INVENTION

In its broadest sense, the invention is a method for removing a metallic plug that has been radially expanded into engagement with the inner wall of a conduit that comprises the steps of heating the plug to a temperature that lowers its tensile yield strength, and applying a tensile force to the plug to elongate the same, thereby radially contracting the plug and relaxing the engagement between the plug and the inner wall of the conduit. After cooling, the plug may then be easily pulled out of the conduit. In the preferred method, the heating step is implemented by conducting a current of electricity across the metallic plug that is sufficient to heat it to a temperature which substantially lowers its tensile yield strength. The elongating tensile force is applied at the same time the electric current is conducted through the metallic plug.

The method is particularly applicable to the relaxation and removal of cylindrical plugs used to seal the ends of the U-shaped heat exchanger tubes mounted in the tubesheets of nuclear steam generators. Such plugs typically include a cylindrical metallic shell having an open end and a closed end whose outer wall is radially expanded into sealing engagement with the inner wall of the tube by means of a cork-shaped expander element which is drawn from the closed to the open end thereof. When the method of the invention is used to remove such a plug, it further includes the step of pushing the expander element from the open end of the cylindrical shell back against the closed end of the shell before the shell-heating electrical current and shell-elongating tensile force is applied. A current of approximately 300 amps having a potential of 5 volts is then applied across the longitudinal axis of the cylindrical shell until the wall of the shell is heated to between 1300 and 1500 degrees F. which lowers the tensile yield of the plug at least 50 percent. At the same time, a tensile force is applied across the cylindrical plug by extending a push-rod through its open end and against its closed end. The push-rod engages the closed end of the plug shell with sufficient force to elongate the plug approximately 10 percent. Such elongation radially contracts the plug, thereby relaxing the engagement between the outer plug walls and the inner tube walls. After cooling, the plug may then be relatively easily pulled from the tube.

The apparatus of the invention comprises an electrically conductive push-rod means capable of conducting a shell-heating electric current through the plug shell which is sufficient to substantially lessen its tensile yield while simultaneously applying a tensile force to the shell sufficient to elongate it. The apparatus may also include a plug securing means for releasably securing the open end of the plug. The push-rod means may apply the requisite tensile force along the longitudinal axis of the plug shell by securing the open end of the plug with the plug securing means, extending the push-rod means through the open end of the shell and then applying a pushing force against the closed end of the shell. In the preferred embodiment, both the plug securing means and the electrically conductive push-rod means are mounted on the same frame.

The electrically conductive push-rod means may include a conductive rod slidably disposed in a concentrically located bore in the rod. This conductive rod may be spring-biased to ensure good electrical contact between the closed end of the plug shell and the electrical power source to which it is connected. The plug securing means may include a collar that is rotatably connected to the frame and which includes screw threads that compliment the screw threads that circumscribe the open end of the shell. Included in the plug securing means is a drive train formed from an electric motor and gear train for selectively rotating the collar into threaded engagement for the open end of the plug. Finally, the apparatus may have a pulling means in the form of hydraulic cylinders connected t the frame for pulling the collar and hence the plug from the open end of the conduit in the last stop of the method f the invention.

The invention provides an effective technique for quickly removing Inconel* plugs from the open ends of heat exchanger tubes mounted in the tubesheet of a nuclear steam generator which does not scratch or scour the inner walls of the tubes, and which may be implemented by a single, robotically manipulable tool.

*Inconel is a registered U.S. Trademark belonging to the International Nickel Company, Inc.

BRIEF DESCRIPTION OF THE DRAWINGS

FIG. 2B is a side view of the plug removal apparatus illustrated in 2A mounted on the frame that also forms part of the tool;

DETAILED DESCRIPTION OF THE PREFERRED EMBODIMENT

Overview of the Apparatus and Method of the Invention

Figure 1:
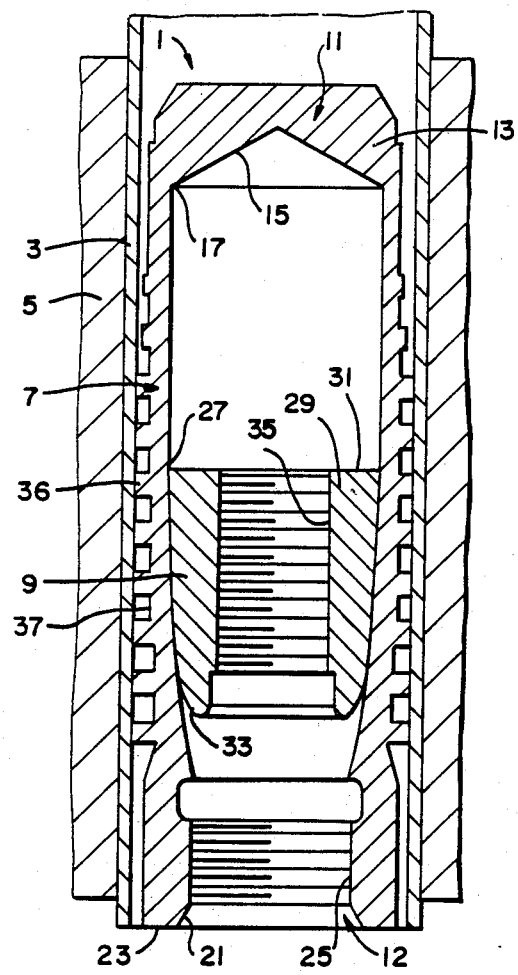
FIG. 1 is a cross-sectional side view of the type of tube plug that the apparatus and the method of the invention removes.
Figure 2A:
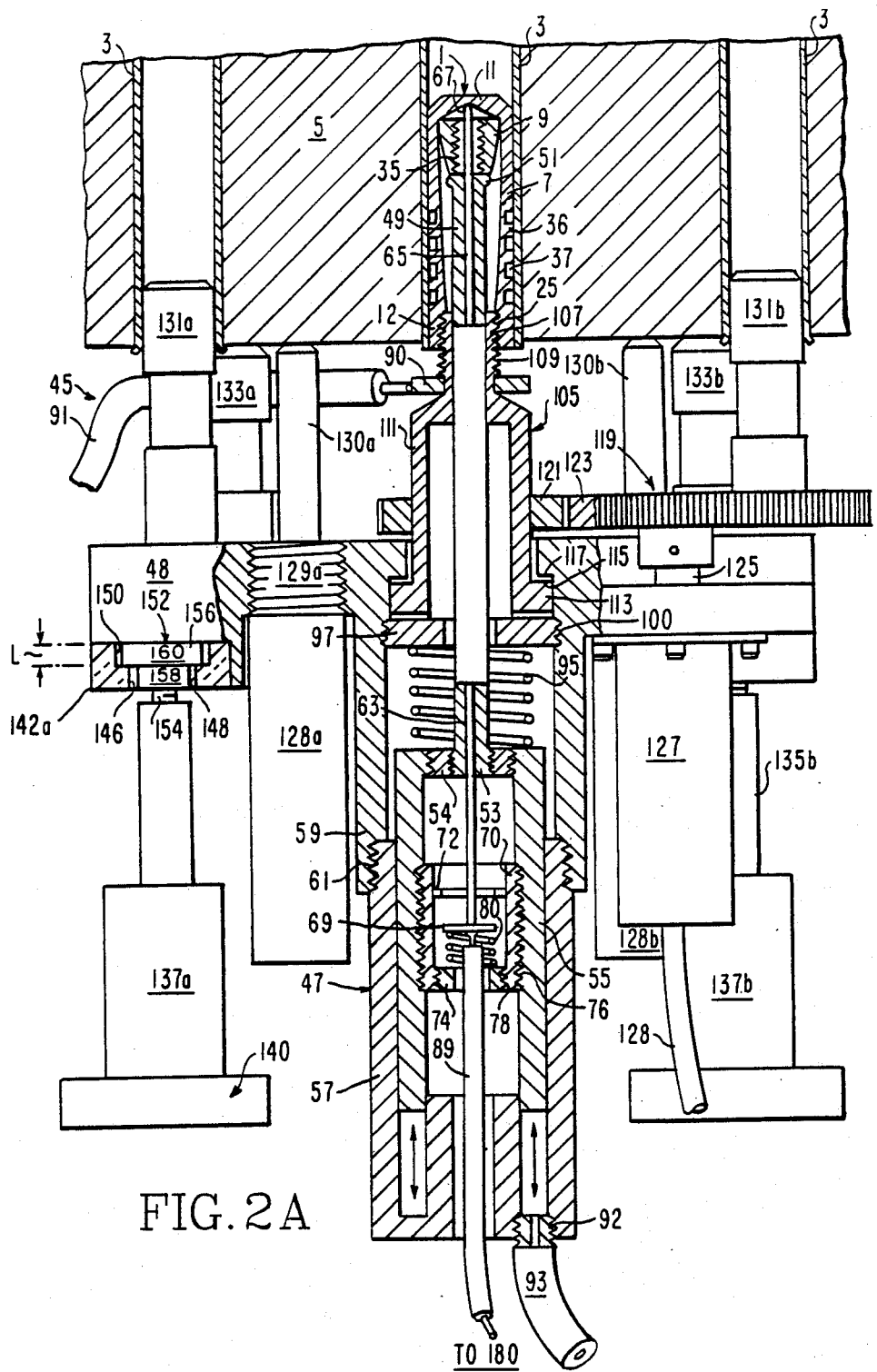
FIG. 2A is a partial cross-sectional front view of the plug removal apparatus of the invention.
Figure 4:
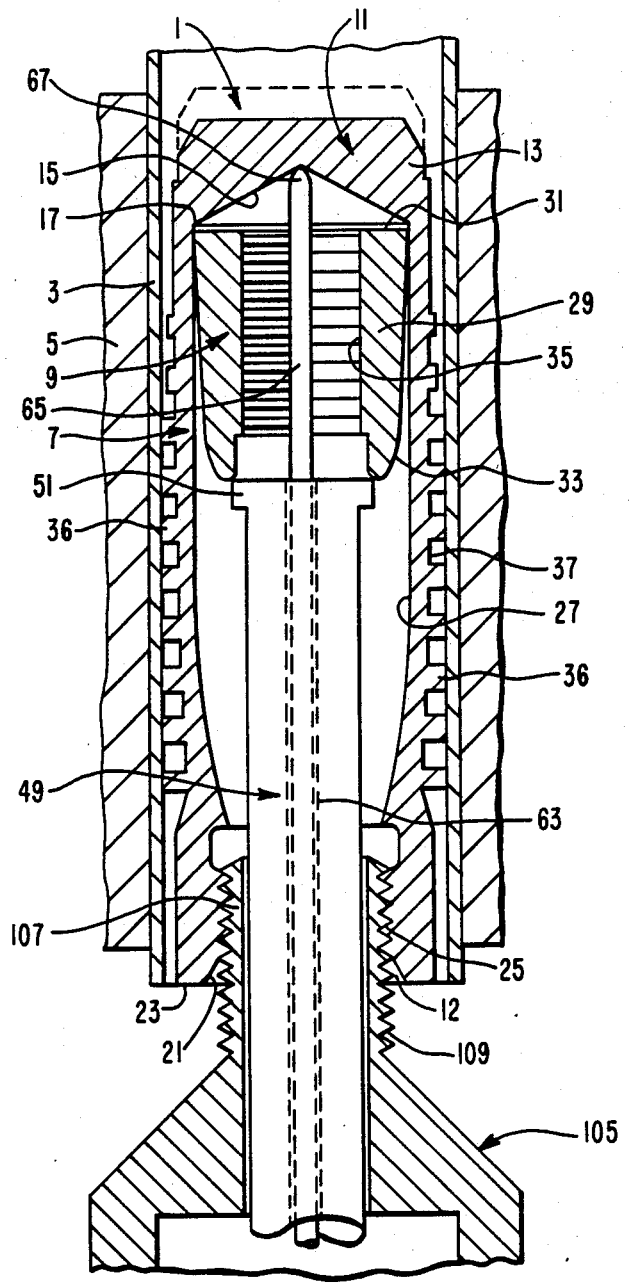
FIG. 4 is a cross-sectional side view of a tube plug in the process of being relaxed and removed by the plug removal apparatus illustrated in FIGS. 2A through 2C.

With reference now to FIGS. 1, 2A and 4 wherein like numerals designate like components throughout all of the several figures, the plug removal apparatus and method is particularly adapted for removing Inconel plugs 1 from the heat exchanger tubes 3 located in the tubesheet 5 of a steam generator, which may be nuclear powered.

Such plugs 1 are generally formed from a tubular shell 7 that contains a tapered expander element 9. The element 9 is slidably movable from the distal closed end 11 of the plug shell 7 to its proximal open end 12. The distal closed end 11 of the shell 7 ends in a circular wall 13 that includes a shallow, conical chamfer 15 on its inner surface. This wall 13 is integrally formed around the top edge of the shell 7 at shoulder 17. The proximal open end 12 of the shell 7 includes a circular opening 21 circumscribed by flat annular wall 23. This circular opening 21 leads to a threaded bore 25 as shown. While the shell walls are of generally uniform thickness, the inner walls 27 of plug shell 7 are tapered inwardly so that when the cork-shaped body 29 of the expander element 9 is drawn from the distal closed end 11 to the proximal open end 12 in the position illustrated in FIG. 1, the outer surface of the plug shell 7 will engage the inner surface of the heat exchanger tube 3.

The cork-shaped body 29 of the expander element 9 includes a flat, circular distal end 31 and a rounded proximal end 33. The rounded proximal end 33 helps the expander element 9 to wedgingly expand the shell 7 when it is drawn down against the tapered inner walls 27, while the relatively sharp edge circumscribing the distal end 31 forms a self-locking mechanism that helps to prevent the expander element 9 from moving back toward the distal closed end 11 of the shell 7 after expansion. The cork-shaped body 29 is provided with a centrally disposed threaded bore 35 which receives a threaded pull-rod (not shown) that is used to pull the expander 9 down during the plugging operation. In such plug shells 7, a plurality of circular lands 36 circumscribe the outer surface. These lands 36 define localized areas of intense engagement between the outer wall of the shell 7 and the inner wall of the tube 3 when the expander element 9 is pulled down to the position illustrated in FIG. 1.

With reference now to FIGS. 2A and 4, the plug removal tool 45 of the invention has a heating and pushing mechanism 47 mounted in a body block 48. A primary component of the mechanism is an electrically conductive push-rod 49 that is extendible and retractable through the proximal open end 12 of the plug shell 7. Concentrically disposed within the push-rod 49 is a bore 63 through which a conductor rod 65 is slidably movable. The conductor rod 65 includes a spring biased plunger 69 for biasing the bullet-shaped nose 67 of the rod 65 into electrical contact with the shallow, conical chamfer 15 of the plug shell 7. As will be described in more detailed hereinafter, the electrically conductive rod 65 is ultimately connected to a high amperage, low voltage power source 180 similar to the power sources used in arc welding, but operated at an even lower voltage to minimize the need for insulation. The bottom of the electrically conductive push-rod 49 includes a threaded end 53 that is screwed into the piston assembly 55 of a pushing cylinder 57. In the preferred embodiment, pushing cylinder 57 and piston assembly 55 are parts of a hollow-plunger type cylinder, such as a Model No. RCH-121 manufactured by Enerpac, Inc., located in Butler, Wisconsin 53007. Such a hollow plunger design is preferred as it simplifies the structure necessary to conduct a high amperage current through conductive rod 65 without short circuiting. The pushing cylinder 57 also has a retraction spring 95 for retracting the push-rod 49 when the pushing cylinder 57 is disconnected from a source of pressurized hydraulic fluid.

The plug removal tool 45 also has a threaded thrust fitting 105 rotatably mounted within the body block 48 and removable by means of drive mechanism 119. The top, distal end 107 of the thrust fitting 105 includes screw threads 109 which are engageable with the threads of the bore 25 present in the proximal open end 12 of the plug shell 7.

Threadedly mounted within the body block 48 of the tool 45 are a pair of thrust cylinders 128a and 128b. Each of these cylinders includes a reciprocable piston rod 130a, 130b which may be engaged to the underside of the tubesheet 5 to apply a pulling force to the plug 1 after it has been relaxed. To elevate the entire body block 48 so that the threaded distal end 107 of the thrust fitting 105 engages the mouth of the threaded bore 25 of the plug 1, a pair of vertical positioning cylinders 137a, 137b is provided between the body block 48 and a robotically manipulable frame 140.

In operation, a commercially available robot, such as the ROSA developed by the Westinghouse Electric Corporation, positions the frame 140 which supports the entire tool 45 to where the distal end 107 of the thrust fitting 105 is concentrically aligned with the threaded bore 25 of the plug 1 to be removed. The vertical positioning cylinders 137a, 137b are next actuated while the drive mechanism 119 that rotates the thrust fitting 105 is operated. If the thrust fitting 105 is properly aligned, its threaded distal end 107 will mate with the threads of the bore 25 located in the proximal open end 12 of the plug 1, thereby securing it to the body block 48.

Next, the pushing cylinder 57 is actuated to extend the push-rod 49 through the bore 25 and against the expander element 9 of the plug 1, which is in the position illustrated in FIG. 1. The pressure within the pushing cylinder 57 is adjusted so that the push rod 49 pushes the expander element 9 against the distal closed end 11 of the plug shell 7 in the position illustrated in FIG. 4, whereupon the cylinder 57 stalls. At this time, the bullet-shaped contactor 67 of the spring biased conductor rod 65 is engaged against the conical chamfer 15 of the plug 1, as shown in FIG. 4. Power source 180 is then connected to electrically conductive rod 65 (which is preferably formed from solid copper) so that approximately 300–400 amps of electricity is passed through the plug shell 7 at a potential of approximately 5 volts. When the plug shell glows with a cherry red incandescence (which indicates it has been heated to a temperature of above 1300 degrees F.), its tensile yield will have been reduced by at least 50%. Since the proximal open end 12 of the plug shell 7 is still secured to the body block 48 by the threaded thrust fitting 105, the net effect of the push-rod 49 pushing against the distal closed end 11 of the shell 7 will be to apply a tensile force across the walls of the shell 7. The hydraulic fluid present in the stalled pushing cylinder 57 is kept at a pressure sufficient to cause the push-rod 49 to elongate the cherry-red plug shell 7 to the extent indicated in phantom, which will have the effect of radially contracting the shell 7 and substantially disengaging the lands 36 from the inner walls of the conduit 3. If the plug 1 were at ambient temperature, the push-rod 49 would fail before effecting the desired elongation, which might require as much as 10,000 pounds. However, because the electricity conducted through the plug shell 7 has heated the shell to a temperature of over 1300 degrees F., the force required for such elongation is less than half, perhaps as little as 1,500 pounds, which could be further reduced by additional heating. After the plug shell 7 has been elongated to the position illustrated in FIG. 4, the electrically conductive rod 65 is disconnected from its power source 180, and the plug 1 is allowed to cool and contract. The pressure in pushing cylinder 57 is then relieved. Finally, the two thrust cylinders 128a and 128b are actuated, which allows the threaded thrust fitting 105 to pull the plug 1 from the tube 3.

As will be seen hereinafter, the purpose of the threaded thrust fitting 105 is to provide a means to secure the plug shell 7 to the body block 48 during the relaxation and removal steps of the method. This securing step is implemented by screwing the threads 109 of the fitting 105 into the threaded bore 25 of the plug 1. To counteract the moment that the drive mechanism 119 applies to both the threaded thrust fitting 105 and the body block 48, torque pins 131a, 131b are provided on the block 48 which are insertable within the open end of other heat exchanger tubes 3 in the tubesheet 5. To ensure correct spacing between the threaded thrust fitting 105 and the plug 1 being removed, standoffs 133a, 133b may also be provided on body block 48.

Specific Description of the Apparatus and Method of the Invention

Figure 2C:
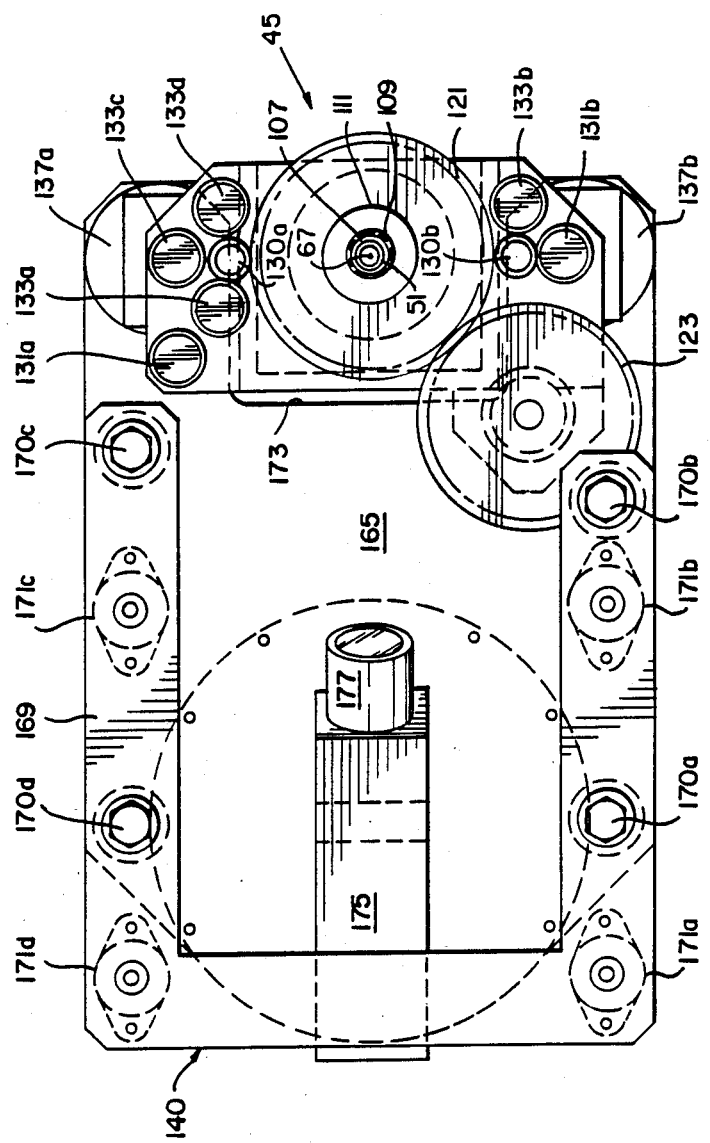
FIG. 2C is a top plan view of the plug removal apparatus and frame illustrated in FIG. 2B.

With reference now to FIGS. 2A, 2B and 2C, the heating and pushing mechanism 47 of the tool 45 includes the previously mentioned electrically conductive push-rod 49. The push-rod 49 has an integrally formed rounded shoulder 51 at its top end for engaging the bottom of the expander element 9, as well as a threaded portion 53 at its bottom end which may be screwed into an electrically insulative, ceramic retaining ring 54 which in turn is threadedly engaged to the top circular wall of the hollow piston assembly 55 of cylinder 57. The piston assembly 55 is, of course, reciprocably movable within the pushing cylinder 57. The pushing cylinder 57 is in turn secured to the body block 48 by means of a tubular flange 59 by way of thread 61.

To accommodate the previously discussed conductor rod 65, the push rod 49 includes a concentrically disposed bore 63. At its top end, the conductor rod 65 includes a bullet-shaped contactor 67 which is complimentary in shape to the conical chamfer 15 of the plug shell 7. At its bottom, the conductor rod 65 includes a spring biased plunger 69 that is preferably integrally formed with the rod 65 itself. To minimize the heat generated in the conductive rod 65 during the heating step of the method, the rod 65 and plunger 69 are fabricated from a highly conductive material such as silver, a gold nickel alloy, or a copper alloy. To prevent short circuiting, the conductive rod 65 is insulated with a spray-on ceramic or other form of strong, thin and effective insulation. The plunger 69 of the conductive rod 65 is reciprocably movable within a ceramic sleeve 70 screwed up into the upper portion of the piston assembly 55 between an annular retaining shoulder 72 and an annular retaining ring 74. The outside surfaces of both the ceramic sleeve 70 and the annular retaining ring 74 include threads 76, 78 as shown for assembly purposes. The plunger 69 of the conductor rod 65 is biased upwardly by means of a coil spring 80 that is made from a resilient metal. The bottom end of the plunger 69 is in turn connected to an outlet wire 89 which is in turn connected to power source 150. To complete the circuit created by the conduction of electricity through the conductor rod 65, a copper ground ring 90 circumscribes the threaded end of the thrust fitting 105. The ground ring 90 is rotatably connected to the distal end 107 of the thrust fitting 105 so as not to interfere with the rotation of the fitting 105. The copper ground ring 90 is connected to ground wire as shown. The ring 90 is clamped tightly to the thrust fitting 105 when a plug heating current is conducted therethrough.

To power the pushing cylinder 57, an inlet nipple 92 connected to a hydraulic power line 93 is screwed into the rear of the cylinder 57 as shown. To ensure that the push rod 49 will retract when the cylinder 57 is relieved of pressurized hydraulic fluid, a retraction spring 95 is disposed between the upper wall of the piston assembly 55 and the lower wall of a retaining ring 97.

The thrust fitting 105 includes a threaded distal end 107 which is circumscribed by a series of screw threads 109 that are undercut with respect to the screw threads of bore 25. The undercut nature of the thread 109 makes it easier to screw the distal end 107 of the fitting 105 into the bore 25. The threaded thrust fitting 105 further includes an enlarged hollow proximal end 111 that terminates in an annular flange 113. The flange 113 is in turn rotatably movable within the annular recess 115, and retained therein by a retaining shoulder 117 on its top side, and the upper surface of the retaining ring 97 on its lower side.

As previously indicated, the thrust fitting drive mechanism 119 rotates the thrust fitting 105 relative to the body block 48 in order to screw the threaded distal end 107 thereof into the threaded bore 25 of the plug shell 7. To this end, the drive mechanism 119 includes a driven gear wheel 121 meshed with a drive gear 123 that is in turn connected to the output shaft 125 of a reversible motor 127. In the preferred embodiment, motor 127 is a Model No. 311A213-9 reversible electric motor available from Hallmark, Inc., located in Dallas, Texas. An electrical power cord 128 is connected to the bottom casing of the motor 127 as shown. Such a motor is advantageously small and relatively lightweight, which in turn helps keep the size and weight of the overall tool 55 down to a relatively small value that can be easily carried and manipulated by commercially available robotic arms.

The body block 48 forms the principal support member of the overall tool 45. On its upper surface, the body block 48 includes a torque pin 131 which may be removably screwed onto the block 48 at any one of three separate pin insert locations 131a, 131b and 131c. In operation, the torque pin 131 is inserted into the open end of a heat exchanger tube 3 being unplugged. When the pin 131 is so inserted, it advantageously counteracts the 10 foot-pounds of torque generated by the thrust fitting drive mechanism 119 when the threaded distal end 107 of the thrust fitting 105 is being screwed into the threaded bore 25 of a plug shell 7. Alternative positions 131a, 131b and 131c for the torque pin 131 are provided in case the preferred adjacent tube is plugged or damaged or is otherwise incapable of receiving the torque pin 131. Also projecting from the top surface of the body block 48 are a set of standoffs 133a, 133b, 133c and 133d. In operation, when a robotic arm (not shown) is used to position the threaded distal end 107 of the tool 45 into a proper position with respect to a particular plug shell 7, these standoffs 133a, 133b, 133c and 133d engage the flat bottom surface of the tubesheet 5 after the torque pin 131 has been inserted into an adjacent tube 3, thereby spacing the threaded distal end 107 a known, proper distance from the tube 3 being unplugged.

All of the lateral positioning of the threaded distal end 107 is accomplished by means of the previously referred to robotic arm, as well as most of the axial positioning. The balance of the axial positioning is achieved by the output rods 135a, 135b, of a pair of vertical positioning cylinders 137a, 137b located under the bottom surface of the body block 48. As may be most easily appreciated from the FIG. 2A, the positioning cylinders 137a, 137b are capable of moving the entire tool vertically a maximum distance of approximately two inches with respect to the frame 140 upon which the cylinders 137a, 137b are mounted.

Floating couplings 142a, 142b connect the body block 58 to the upper ends of the cylinder output rods 135a, 135b. The following description will be specifically confined to the structure of coupling 142a, since the structure of coupling 142b is identical. Coupling 142a is formed in part from a block made from Delrin or some other self-lubricating plastic having a bore 146 in the position illustrated. The bore has a bottom portion 148, and a top enlarged portion 150. The coupling 142a further includes a retaining screw 152 having a threaded shank 154 at its bottom that is received within a bore (not shown) in the upper portion of the output rod 135a and a stepped head 156 whose proximal portion 158 is receivable within the proximal portion 148 of the bore 146, and whose distal enlarged portion 160 is receivable within the distal enlarged portion 150 of the bore 146. The radii of the proximal and distal enlarged portion 148, 150 of the bore 146 is approximately one-sixteenth of an inch greater than the proximal and distal enlarged portion 158, 160 of the stepped head 156. However, the vertical length L of the distal enlarged portion 150 of the bore 146 is only very slightly greater than the length of the distal enlarged portion 160 of the head 156 (i.e., one one-thousandth of an inch or less). The end result of such dimensioning is that the retaining screw 152 is capable of moving laterally one-eighth of an inch in any direction, but is incapable of moving to any significant degree in the vertical (or axial) direction. The lateral slack afforded by the floating couplings 142a, 142b allow the pushing tip 51 to align itself to some degree as it is being pushed into the centrally disposed bore 35 of the expander element 9 lodged near the bottom of a plug shell 7.

With reference now to FIGS. 2B and 2C, the tool 45 of the invention further includes the previously mentioned frame 140. This frame 140 serves to connect the plug expander removal tool 55 to the arm of a ROSA or other commercially available robot. The frame 140 includes a rectangularly shaped bottom support plate 165. A ROSA coupler 166 extends downwardly from the bottom surface of the support plate 165, while four connecting rods 167a, 167b, 167c and 167d extend from the upper surface of the plate 165 (of which only 167a and 167b are visible). The rods 167a, 167b, 167c and 167d connect a U-shaped top plate 169 over the support plate 165. A notch (not shown) is provided in rod 167b to avoid mechanical interference with gear 123. Bolts 170a-170d are used to secure the top plate 169 to these connecting rods. Mounted on the upper side of the top plate 169 are four leveling switches 171a-171d. Basically, these leveling switches 171a-171d inform the operator of the tool 45 when the top plate 169 is uniformly engaged against the bottom surface of the tube sheet 5. In the preferred embodiment, the leveling switches 171a-171d are Model No. 185-1E07 linear pot assemblies available from the Westinghouse Electric Corp. located in Pittsburgh, Pennsylvania. As may best be appreciated with respect to FIG. 2B, the tool 45 is carried on the front edge of the frame 140. In order to avoid mechanical interference between the bottom support plate 165 of the frame 140 and the pushing cylinder 57 of the heating and pushing mechanism 47, a square notch 173 is provided in the front edge of the plate 165 as shown. To further assist the operator in correctly positioning the tool 45, a TV camera 175 is provided in the frame 140 with its lens 177 oriented toward the push-rod 49. The camera 175 is mounted onto the bottom support plate 165 by means of a bracket 179. Additionally, a light source 181 is provided on the bottom support plate 165 to illuminate the under side of the tube sheet 5 during the positioning operation.

Figure 3:
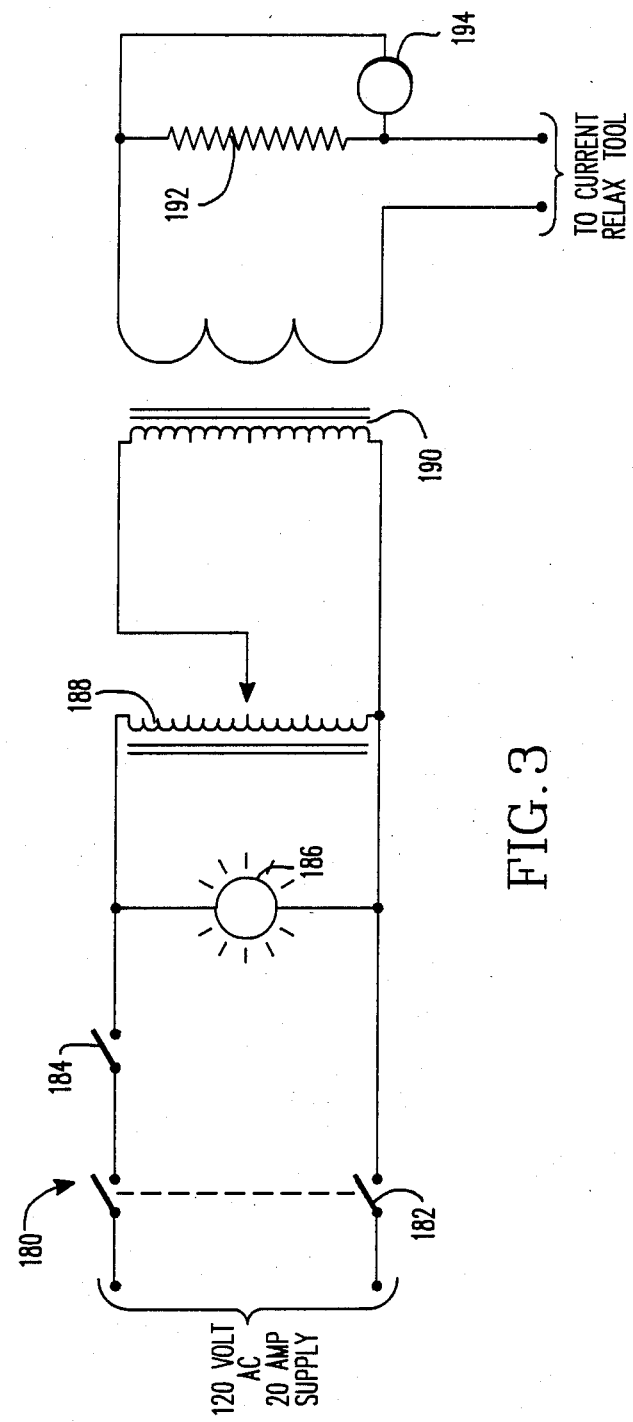
FIG. 3 is a schematic diagram of the power supply that is electrically connected to the push-rod of the plug removal apparatus.

With reference now to FIG. 3, the power supply 180 of the tool 45 includes a double pole, double throw switch 182 for selectively connecting a conductive rod 65 to the output of power supply 180. A 20 amp circuit breaker 184 is provided in the position shown to protect the power supply 180 in the event of a short circuit. An indicator lamp 186 is connected in parallel across the two poles of the circuit to indicate when the power supply 180 is "on". A variac 188 is connected in series to a 6 volt, 400 amp transformer 190 in order to control the current of the low voltage, high amperage current produced at the output end of the power supply 180. An amp meter 192 is connected in series to one of the output leads of the power supply 180 to indicate how much current is being conducted through the conductive rod 65.

The method of the invention may best be understood with reference to FIGS. 1, 2A and 4. In the first step of the method the expander element 9 of an expanded plug is pushed upwardly back against the distal closed end 11 of the shell 7. To this end, the plug removal tool 45 is manipulated underneath a selected heat exchanger tube 3 by means of a ROSA or other commercially available robot. The television camera 175 and light source 181 are actuated, and the system operator uses the resulting t.v. image to steer the tool 45 generally into position by way of frame 140. During the last phases of this step, the system operator aligns the electrically conductive push-rod 49 with a selective tube 3 while further aligning the pin inserts 131 with one of the heat exchanger tubes 3 located on either side of the selected tube 3. He then raises the frame 140 into abutment against the tubesheet 5 until the leveling switches 171a through 171b indicate the top plate 169 of the frame 140 is in level engagement with the bottom surface of the tubesheet 5. The system operator then actuates the vertical positioning cylinders 137a, 137b to insert the push-rod 49 through the threaded bore 25 of the proximal open end 12 of the shell so that the rounded shoulder 51 of the rod 49 abuts the proximal end 33 of the expander element 9. The actuation of the vertical positioning cylinders 137a, 137b further serves to insert torque pin 131 into one of the heat exchanger tubes 3 linking the selected tube 3. As has been previously pointed out, the floating couplings 142a, 142b compensate for any small misalignment between the push-rod 49 and the threaded bore 25 of the plug shell 7 by freely allowing small amounts of lateral movement during the insertion operation.

While the push-rod 49 is being so inserted, the drive mechanism 119 of the threaded thrust fitting 105 is actuated in order to engage the threads 109 thereof into the threaded bore 25 located at the proximal open end 12 of the plug shell 7. After the thrust fitting 105 has been screwed into the plug shell 7, the pushing cylinder 57 of the heating and pushing mechanism is actuated until the expander element 9 is pushed completely against the distal closed end 11 of the shell 7.

Once this has been accomplished, the cylinder 57 stalls, and the bullet-shaped contactor 67 at the end of the conductor rod 65 is in engagement with the shallow conical chamfer 15 within the plug shell 7 by virtue of the force applied to the rod 65 by the spring-biased plunger 69 at the bottom thereof. The double pole, double throw switch 182 is then closed in order to conduct a current of about 300 amps at a 5 volt potential through the plug shell 7. During this time, hydraulic pressure is maintained in the pushing cylinder so that the push-rod 49 applies a constant pushing force against the distal closed end 11 of the plug shell 7. Since the proximal end 12 of the shell 7 is still secured to the threaded thrust fitting 105, the net effect of the pushing force exerted by the push-rod 49 against the closed distal end 13 of the shell 7 is to apply tensile force along the longitudinal axis the the shell 7. Since the cross sectional area of the plug shell 7 is at its smallest in the central region of the shell 7 just below the expander element 9 (see FIG. 4), the electricity conducted by the conductor rod 65 will cause this region of the plug shell 7 to heat up the fastest and to glow the brightest. When the shell 7 glows cherry red or brighter in this region, the tensile yield of the shell 7 will be reduced by a factor of at least 50 percent. The tensile force applied by the push-rod 49 will then begin to elongate the plug shell 7 to the position indicated in phantom. This, in turn, will have the effect of radially contracting the lands 36 on the outside of the shell 7 away from the inner surface of the conduit 3, as indicated by the arrows in phantom.

Once the shell 7 has been elongated to the position indicated, the double pole, double throw switch 182 of the power supply 180 is opened, and the plug shell 7 is allowed to cool for a period of approximately one minute. The resulting cooling results in a thermal differential contraction of the lands 36 even further away from the inner surface of the walls of the conduit 3.

Finally, both of the thrust cylinders 128a and 128b are actuated so that their respective piston rods 130a and 130b push against the bottom side of the tubesheet 5. Because these piston rods 130a, 130b are connected to the threaded thrust fitting 105 through body block 48, the plug shell 7 is pulled out of the open end of the tube 3.

We claim:

1. A method for removing a plug from a conduit wherein said plug is formed from a metallic shell whose interior includes a tapered wall section as well as an expander element that wedgingly coacts with the tapered wall section when moved into engagement therewith to expand the outer wall of the shell into engagement with the conduit, comprising the steps of:
   a. moving the expander element out of engagement with the tapered wall section;
   b. heating the tapered wall section to a temperature sufficient to substantially lower the tensile yield strength of said wall section by applying an electric current to said wall section with a pushing means;
   c. applying a tensile force across the tapered wall section with said pushing means while said wall section is at said yield strength lowering temperature that is sufficient to elongate the same along the longitudinal axis of the conduit, thereby lessening the engagement between said wall section and said conduit, and
   d. pulling said plug from said conduit.

2. A method for moving a plug from a conduit as defined in claim 1, further including the step of allowing said wall section to substantially cool down and thereby contract before pulling said plug from said conduit.

3. A method for removing a plug from a conduit as defined in claim 1, wherein said tapered wall section is heated to a temperature sufficient to lower the tensile yield strength by about 50 percent.

4. A method for removing a plug from a conduit as defined in claim 1, wherein the plug shell is cylindrical, the conduit is a tube, and said shell and tube are both formed from an alloy that includes nickel.

5. A method for removing a plug from a conduit as defined in claim 4, wherein the tapered wall section is heated by conducting an electric current therethrough sufficient to bring the wall section to a temperature of about 1300 degrees F.

6. A method for removing a plug from a conduit as defined in claim 5, wherein said plug shell has an open and a closed end, and wherein said tensile force is applied by grasping said open end and extending a push-rod means against said closed end.

7. A method for removing a plug from a conduit as defined in claim 6, wherein said push-rod means simultaneously pushes against the closed end while conducting said electric current through said tapered wall section of said shell.

8. A method for removing a plug from a tube mounted in a tubesheet, wherein said plug includes an elongated cylindrical shell formed from a nickel alloy having a closed end and an open end, the interior of said shell including a tapered wall section, a well as an expander element that wedgingly coacts with the tapered wall section to radially expand the outer wall of the shell into engagement with the inner wall of the tube when the expander element is pulled from the closed end to the open end of the shell, comprising the steps of:
   a. pushing the expander element from the open end to the closed end of the shell;
   b. heating the tapered wall section to a temperature sufficient to lower the tensile yield thereof by at least 50 per cent by conducting an electric current across said wall section by applying an electric current through said wall section with a pushing means;
   c. applying a tensile force across the tapered wall section with said pushing means that is sufficient to elastically elongate the plug shell along its longitudinal axis so that the engagement between the outer wall of the shell and the inner wall of the tube is reduced, wherein said tensile force is applied while said tapered wall is being heated to said tensile yield lowering temperature;
   d. disconnecting said electric current from said wall section and allowing said wall section to cool and thermally contract further out of engagement with said tube; and
   e. pulling said plug from said tube.

* * * * *